July 15, 1952  F. J. WEMPE  2,603,057

SELF-CLEANING GARDEN RAKE

Filed March 27, 1950

Fridolin J. Wempe
INVENTOR.

BY *Clarence A. O'Brien*
and *Harvey B. Jacobson*
Attorneys

Patented July 15, 1952

2,603,057

UNITED STATES PATENT OFFICE 2,603,057

SELF-CLEANING GARDEN RAKE

Fridolin J. Wempe, Wichita, Kans.

Application March 27, 1950, Serial No. 152,024

1 Claim. (Cl. 56—400.08)

This invention relates to a rake cleaning device and has for its primary object to automatically clean the teeth of a rake when the rake head is raised out of ground engagement.

Another important object of this invention is to provide a simple and inexpensive attachment for a conventional rake that will strip clinging grass or debris from the teeth of the rake.

These and ancillary objects and structural features of merit are attained by this invention, the preferred embodiment of which is set forth in the following description and illustrated in the accompanying drawings, wherein.

Figure 1:
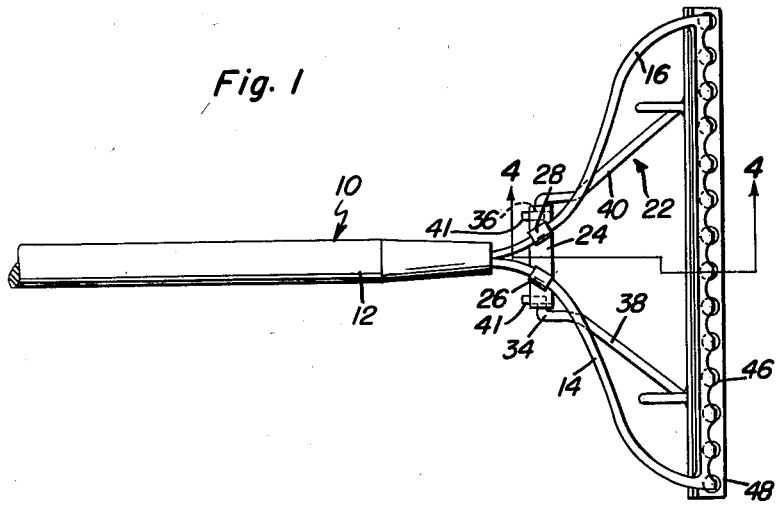
Figure 1 is a top plan view of a rake with the cleaning attachment of this invention operatively attached thereto.
Figure 2:
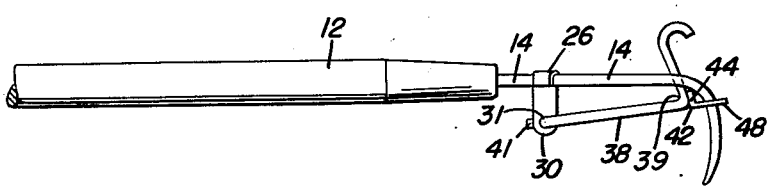
Figure 2 is a side elevational view.

In the accompanying drawing, the rake 10 is of conventional construction and includes a handle 12 from one end of which outwardly diverging supporting arms 14 and 16 project. A bar 18 is supported by the outer ends of the arms 14 and 16 and a plurality of spaced, depending teeth 20 are carried by said bar.

Self cleaning or automatic stripping means 22 is provided and is easily attached to the rake head. This stripping means includes a substantially U-shaped hanger 24 which is provided on its bight portion with a pair of loops 26 and 28 sleeved on the inner end portions of the arms 14 and 16. The depending legs 30 and 32 of the hanger 24 are provided with openings 31 which receive the transversely aligned portions 34 and 36 of a pair of forwardly diverging swinging arms 38 and 40, respectively, said arms 38 and 40 terminating in angularly turned rear end portions 41. The arms 38 and 40 further comprise angularly turned, upstanding forward portions 50 which terminate in forwardly and downwardly curved stop hooks 52 which are engageable with the bar 18 for positively limiting the downward swinging movement of the stripping means.

Fixed as by welding on the forward angles 39 of the arms 38 and 40 is an angle iron stripper bar 42. The bar 42 has its vertical flange 44 secured to the arms 38 and 40 and spaced openings 46 are formed in the horizontal flange 48 to receive the teeth 20.

Figure 4:
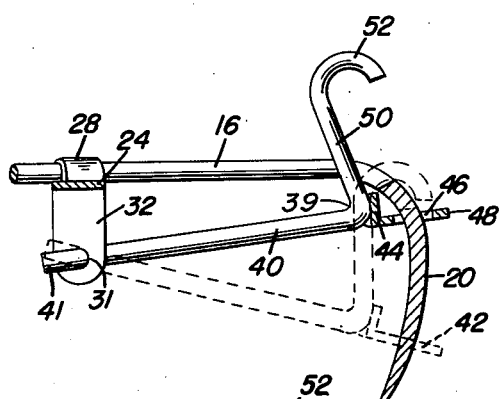
Figure 4 is a transverse sectional view on an enlarged scale, taken on line 4—4 of Figure 1.
Figure 3:
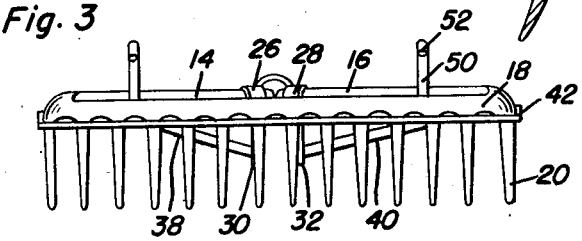
Figure 3 is a front elevational view.

In use, the stripper bar is positioned at the inner ends of the rake teeth 20, as seen in Figure 4, and when the rake head is raised lifting the teeth out of ground contact, the bar automatically, due to its weight, slides downwardly on the teeth to remove grass and other debris from said teeth.

However, since many other modifications and purposes of this invention will become readily apparent to those skilled in the art upon a persual of the foregoing description, it is to be understood that certain changes in style, size and components may be effected without a departure from the spirit of the invention and within the scope of the appended claim.

Having described the invention, what is claimed as new is:

In a rake of the type comprising a handle and a head assembly including a pair of forwardly diverging arms on one end of the handle, a bar extending transversely between the forward ends of said arms and spaced teeth depending from said bar, a cleaning attachment comprising an inverted substantially U-shaped hanger mounted transversely beneath the rear end portions of the arms and having openings in its depending legs, attaching loops on the bight portion of the hanger engaged with the arms, a pair of forwardly diverging arms mounted for vertical swinging movement on the hanger and including transversely aligned portions journalled in said openings and terminating in angularly turned rear end portions, the second named arms further including angularly turned, upstanding free end portions terminating in forwardly and downwardly curved stop hooks engageable with the bar, and an apertured stripper bar fixed on the forward angles of the second named arms and operable on the teeth.

FRIDOLIN J. WEMPE.

REFERENCES CITED

The following references are of record in the file of this patent:

UNITED STATES PATENTS

| Number | Name | Date |
|--------|------|------|
| 333,267 | Van Winkle | Dec. 29, 1885 |
| 554,722 | Paynton | Feb. 18, 1896 |
| 1,958,757 | Klingler | May 15, 1934 |